United States Patent [19]

Ishimaru et al.

[11] Patent Number: 5,255,047
[45] Date of Patent: Oct. 19, 1993

[54] STROBO CONTROLLING APPARATUS

[75] Inventors: Toshiaki Ishimaru, Hachioji; Minoru Hara, Hino; Atsushi Maruyama, Machida; Keiichi Tsuchida, Hachioji, all of Japan

[73] Assignee: Olympus Optical Co., Ltd., Tokyo, Japan

[21] Appl. No.: 929,476

[22] Filed: Aug. 17, 1992

Related U.S. Application Data

[63] Continuation of Ser. No. 654,818, Feb. 13, 1991, abandoned.

[30] Foreign Application Priority Data

Feb. 13, 1990 [JP] Japan .................................. 2-32194

[51] Int. Cl.$^5$ .......................................... G03B 15/05
[52] U.S. Cl. ................................. 354/416; 354/421; 354/422; 354/137
[58] Field of Search ............... 354/416, 417, 415, 418, 354/420, 421, 422, 137

[56] References Cited

U.S. PATENT DOCUMENTS

| 4,058,818 | 11/1977 | Johnson et al. | 354/417 |
| 4,494,850 | 1/1985 | Katsuma et al. | 354/416 |
| 4,771,309 | 9/1988 | Ogihara et al. | 354/418 |
| 4,806,963 | 2/1989 | Kobayashi et al. | 354/415 |

Primary Examiner—W. B. Perkey
Attorney, Agent, or Firm—Louis Weinstein

[57] ABSTRACT

In a strobe controlling apparatus, there are provided respective information outputs for outputting respectively the guide number information GV, film sensitivity information SV and object distance information DV, a judged diaphragm value is determined by the operation of $GV+SV-DV$ from their outputs, the above-mentioned diaphragm value is compared with a predetermined value memorized in advance, in case the above-mentioned diaphragm value is smaller, the diaphragm will be controlled and, in case the above-mentioned diaphragm value is larger, the flash amount will be controlled so that, particularly, at the time of strobe photographing, the short distance exposure may be prevented from being over-exposed and a proper exposure is made possible.

30 Claims, 12 Drawing Sheets

STROBO CONTROLLING APPARATUS

This is a continuation of application Ser. No. 07/654,818, filed Feb. 13, 1991, now abandoned.

BACKGROUND OF THE INVENTION

1. Field of the Invention

This invention relates to strobe controlling apparatus and more particularly to a strobe controlling apparatus for properly controlling the exposure to prevent the over exposure at the time of strobe flash photographing an object at a short distance and to deepen the photographed field depth on the short distance side.

2. Related Background Art

As is well known, in the exposure control at the time of strobe flash photographing with a lens shutter camera such as a compact camera, there is generally used a so-called flashmatic system of automatic exposure controlling system which is of a guide number (abbreviated as GNo hereinafter) of a fixed value (substantially full flash GNo)(See U.S. Pat. No. 4,899,191). In this flashmatic system (abbreviated as an FM system hereinafter), on the basis of the fact that the guide number, that is, the product of the diaphragm and irradiated distance is constant, an object distance (mentioned as D [m] hereinafter) by range finding information measured by a range finding means within the camera is used for the strobe guide number GNo of a fixed value to control the diaphragm value (mentioned as FNo hereinafter) of the lens and to obtain a proper exposure. That is to say, the FNo is determined from the formula $$GNo = FNo \times D \times \sqrt{S(100)/S} \qquad (1)$$

to control the diaphragm. Here, S represents an ISO sensitivity of the film and S(100) represents a film sensitivity at the time of ISO 100. When the above-mentioned formula (1) is modified, it will be $$FNo = GNo \times (1/D) \times \sqrt{S/S(100)} \qquad (2)$$

The FMv diagram for determining a proper exposure when this FM system is used shall be explained in the following with FIG. 15. As a method of determining a proper exposure by an external light (light other than the strobe light) is generally used the formula of an apex system shown below:

$$EV = AB + TV = BV + SV$$

wherein EV represents an exposure value, AV represents an aperture value and is shown by the following formula:

$$AV = \log_2 (FNo)^2 \qquad (3)$$

TV represents a time value and is shown by the following formula:

$$TV = \log_2 (1/T) \qquad (4)$$

wherein T represents a shutter second time, that is, an effective exposure time (in seconds) of the shutter, BV represents a brightness value (or a luminance value) and is shown by the following formula:

$$BV = \log_2 \{B / (K \cdot N)\}$$

wherein B represents a luminance of the object to be photographed, K and N are exposure constants determined by the camera and the K value is usually 1.3 in this camera and further SV represents an ASA (ISO) speed value and a sensitivity of the film and is shown by the following formula:

$$SV = \log_2 (N \cdot S) \qquad (5)$$

wherein S represents an ISO sensitivity of the film and, for example, in case S is 100 and N is 0.32, the SV value will be 5.

If the specification of a camera is represented by the EV diagram shown in the upper part of FIG. 15, the relation between the above-mentioned AV value and TV value will be determined by the thick line L in the middle of the above-mentioned FIG. 15 and the exposure condition in case no strobe is used will be determined on the basis of the EV value corresponding to the SV value and BV value. That is to say, if BV=5 and SV=5, EV will be:

$$EV = 5 + 5 = 10$$

and, from the intersection of the equal EV line of EV=10 and the thick line L, the exposure condition will be controlled with AV=4.5 and TV=5.5.

The case of using a strobe shall be explained in the following. In this camera, the flashmatic flash point will be operatively connected between 1/100 second and 1/500 second when the effective exposure time shows a γ conversion point. When this is converted to an AV value, it will be:

$$4.5 \leq AV \leq 6.7$$

When both sides of the above-mentioned formula (1) are squared and their logarithms are taken and arranged, $$\log_2 GNo^2 = \log_2 FNo^2 + \log_2 D^2 + \log_2 S (100) - \log_2 S \qquad (6)$$

will be obtained. When the GV value of the guide number information and DV value of the distance information are set to be:

$$GV = \log_2 GNo^2 \text{ and}$$

$$DV = \log_2 D^2$$

and further when the formulae (3) and (5) are substituted in the formula (6), $$GV = AV + DV - SV + 5 \qquad (7)$$

will be made. In this camera, as the GNo is only of a full flash (14 as GNo), the GV value of this full flash shall be GVm (=7.6). Also, as films of ISO 400 tend to be usually mostly used, ISO 400, that is, SV=7 is substituted in the above-mentioned formula (7) to obtain $$GVm = AV + DV - 7 + 5$$

Therefore, $$DV = GVm - AV + 2 \quad (8)$$
$$= 7.6 - AV + 2$$
$$= 9.6 - AV$$

The operatively connecting range of the AV value will become:

$$4.5 \leq AV \leq 6.7$$

When the formula (8) is substituted in the above formula, the operatively connecting range of the DV value will be $$3.1 \leq DV \leq 5.1$$

Therefore, in the FMv diagram (GNo=14 constant) in FIG. 15, the exposure will be proper in the region Rg2 but will be over-exposed in the region Rg1 (of about 3 m to a very short distance) and will be under-exposed in the region Rg3 (of about 6 m to a long distance).

Thus, in the exposure controlling system in the conventional lens shutter camera, there has been a defect that the exposure is likely to be over-exposed at a very short distance. As the frequency of using high sensitivity films tends to increase with the improvement of the quality of the high sensitivity films, the above-mentioned defect can be said to be a great problem.

In this case, there is an over exposure preventing means by directly measuring the strobe light and stopping the flash when a required light amount is reached. However, by this means, the flash timing can not be determined. That is to say, the flash amount at the time of a fixed diaphragm is only controlled. Therefore, the operatively connecting range will be limited only to the range in which the direct light measurement follows.

In this kind of conventional technical means, in the case of controlling the exposure in the FM system by using a high ISO sensitivity film in such camera adopting a lens shutter as a compact camera, the exposure will be proper in the region Rg2 in the above-mentioned FIG. 15 but will be over-exposed in the region Rg1 on the short distance side. Therefore, by the means of directly ensuring the strobe light and stopping the flash when a required light amount is reached, only the flash amount at the time of a fixed diaphragm value has been able to be controlled.

SUMMARY OF THE INVENTION

An object of this invention is to provide a strobe controlling apparatus whereby an over exposure at a short distance at the time of strobe photographing and which in unavoidable in the conventional flashmatic control is prevented and a proper exposure can be made.

In the strobe controlling apparatus of the present invention, a flash time variable strobe apparatus is used and, first of all, $GV + SV - DV$ is obtained from a guide number information GV, film sensitivity information SV and object distance information DV to determine a diaphragm value for judgment. It is characterized in that, when the above-mentioned diaphragm value is compared with a predetermined value memorized in advance, in case the above-mentioned diaphragm value is smaller than the predetermined value, the strobe will flash at a substantially full flash and, in case the above-mentioned diaphragm value is larger than the predetermined value, the above-mentioned diaphragm value will be fixed, the guide number of the above-mentioned strobe will be operated from the above-mentioned film sensitivity information and object distance information and the flash time of the above-mentioned strobe will be controlled so as to be of this guide number.

The above-mentioned control is made along such FMv diagram shown in FIG. 2. For example, when the object is at a distance within the region Rg1 in which the exposure is over-exposed at a very short distance in FIG. 15 showing the conventional example, the flash time will be made shorter and the GNo of the flash will be made smaller to control the exposure as in the region Rg4 in FIG. 2.

Therefore, according to the present invention, there can be provided a strobe controlling apparatus having a remarkable effect that a photograph of a proper exposure can be easily taken even under the condition of short distance photographing when the exposure has been over-exposed in the conventional strobe photographing when using a high ISO value film.

BRIEF DESCRIPTION OF THE DRAWINGS

FIG. 3 is a block diagram of a camera having the above-mentioned strobe controlling apparatus in FIG. 1 built-in.

DETAILED DESCRIPTION OF PREFERRED EMBODIMENTS

Figure 1:
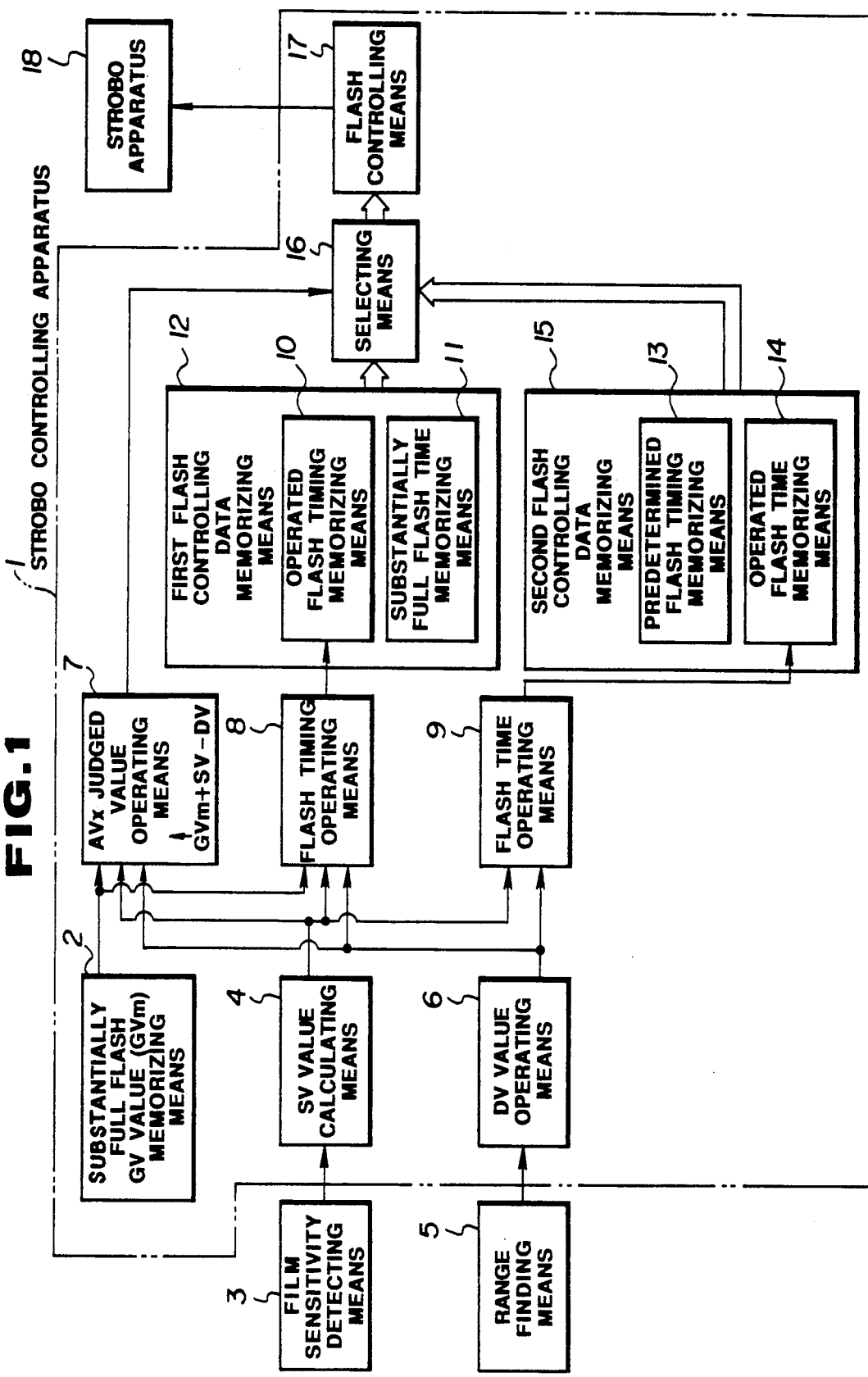
FIG. 1 is a block diagram of a strobo controlling apparatus showing an embodiment of the present invention.
Figure 2:
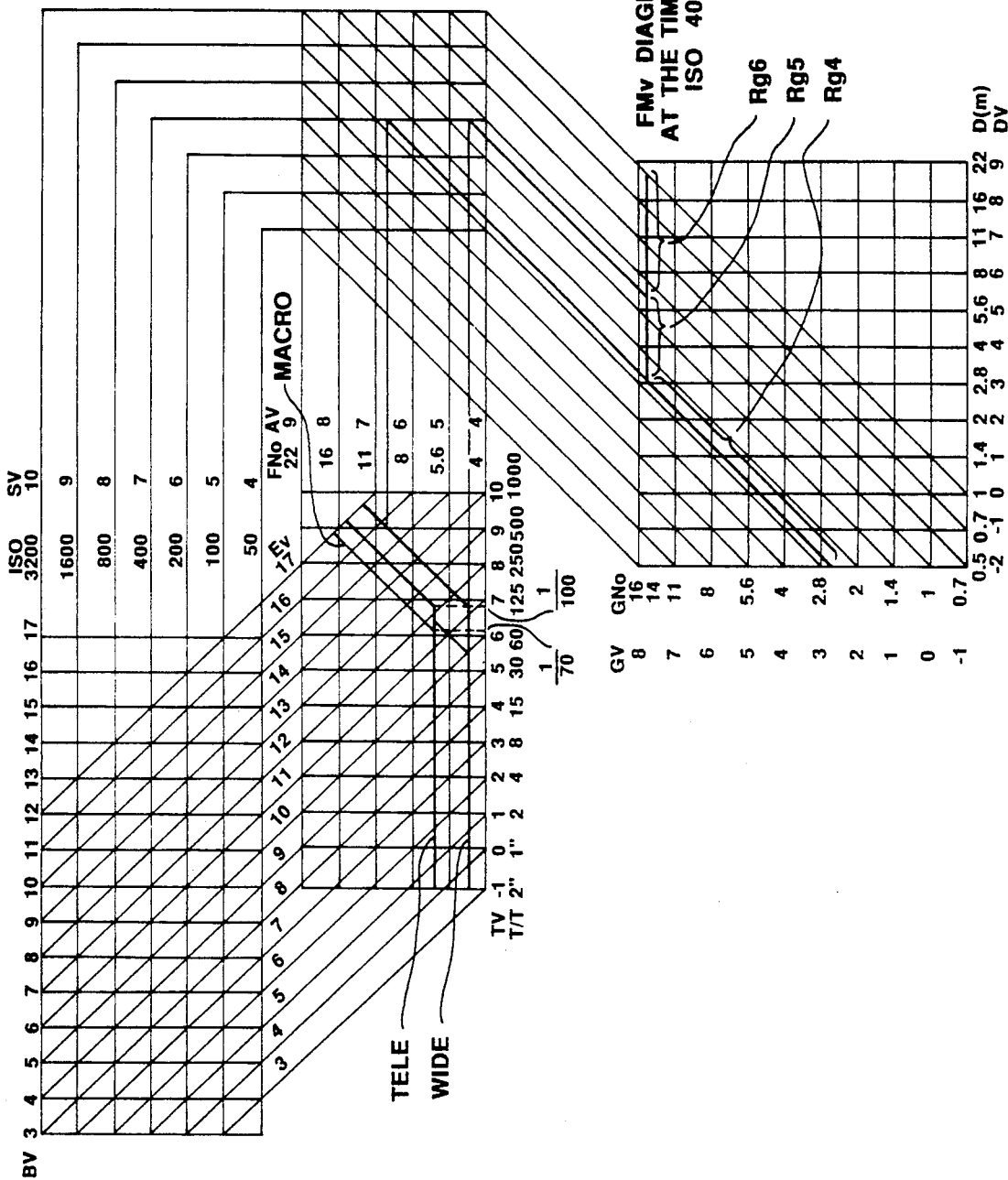
FIG. 2 is an FMv diagram for determining a proper exposure condition of a camera to which the above-mentioned embodiment in FIG. 1 is applied.

The present invention shall be concretely explained in the following by the illustrated embodiments. FIG. 1 is a block formation diagram of a strobo controlling apparatus showing the first embodiment of the present invention. FIG. 2 is an FMv diagram for its design. In FIG. 1, when a film sensitivity is detected by a film sensitivity detecting means 3, an SV value will be calculated by an SV value calculating means 4. Also, a DV value will be operated by a DV value operating means 6 on the basis of range finding data output by a range finding means 5. When the three data of the data GVm memorized by a memorizing means 2 of the GV value of a substantially full flash and the above-mentioned SV value and DV value are first input into a judged value operating means 7 of a judged diaphragm value AVx (=GVm+SV−DV), the diaphragm value AVx will be obtained by this judged value operating means 7 and will be judged to be larger than a predetermined value or not.

When the diaphragm value AVx is larger than the predetermined value, it will be judged to be in the region Rg4 in FIG. 2 and, when it is smaller, it will be judged to be in the region RgS. Also, the above-mentioned three data of GVm, SV and DV are input into a flash timing operating means 8. In this operating means 8, the flash in the region Rg5 or Rg6, that is, the flash timing at the time of a substantially full flash will be obtained from GVm, SV and DV. The operation result will be memorized in an operated flash timing memorizing means 10 and the substantially full flash time will be memorized in a substantially full flash time memorizing means 11. The combination of these two memorizing means 10 and 11 is a first flash controlling data memorizing means 12 in which the flash controlling data at the time of the regions Rg5 and Rg6 will be memorized.

Also, the above-mentioned two data DV and SV are input into a flash time operating means 9 in which the flash time at the time of the region Rg4, that is, the flash time at the time of a predetermined flash timing (AV=6.7 and TV=9 in FIG. 2) will be obtained. The result will be memorized in an operated flash time memorizing means 14. A predetermined flash timing will be memorized in a predetermined flash timing memorizing means 13. The combination of the above-mentioned two memorizing means 13 and 14 is a second flash controlling data memorizing means 15 in which the flash controlling data at the time of the region Rg4 will be memorized.

The data output from these first and second flash controlling data memorizing means 12 and 15 are input into a selecting means 16 and the data operated and selected by the judged value operating means 7 of the AVx value are output to a flash controlling means 17 so that the flash timing and flash time of a strobe apparatus 18 may be thereby controlled.

Thus, in the regions Rg5 and Rg6, that is, on the long distance side, the flash will be a full flash and the FNo at the time of flashing will be controlled (the diaphragm controlling region of the FNo controlling region). On the other hand, in the region Rg4, that is, on the short distance side, the FNo at the time of flashing will be fixed and the flash time will be controlled (the GNo controlling region or diaphragm controlling region). Thereby, the strobe operatively connecting range is a sum of the controlled part of the flash amount and the controlled part of the FNo and a control in a wide range is possible. A strobe controlling apparatus 1 of the present invention comprises the above mentioned means and apparatus 2 to 18.

Figure 3:
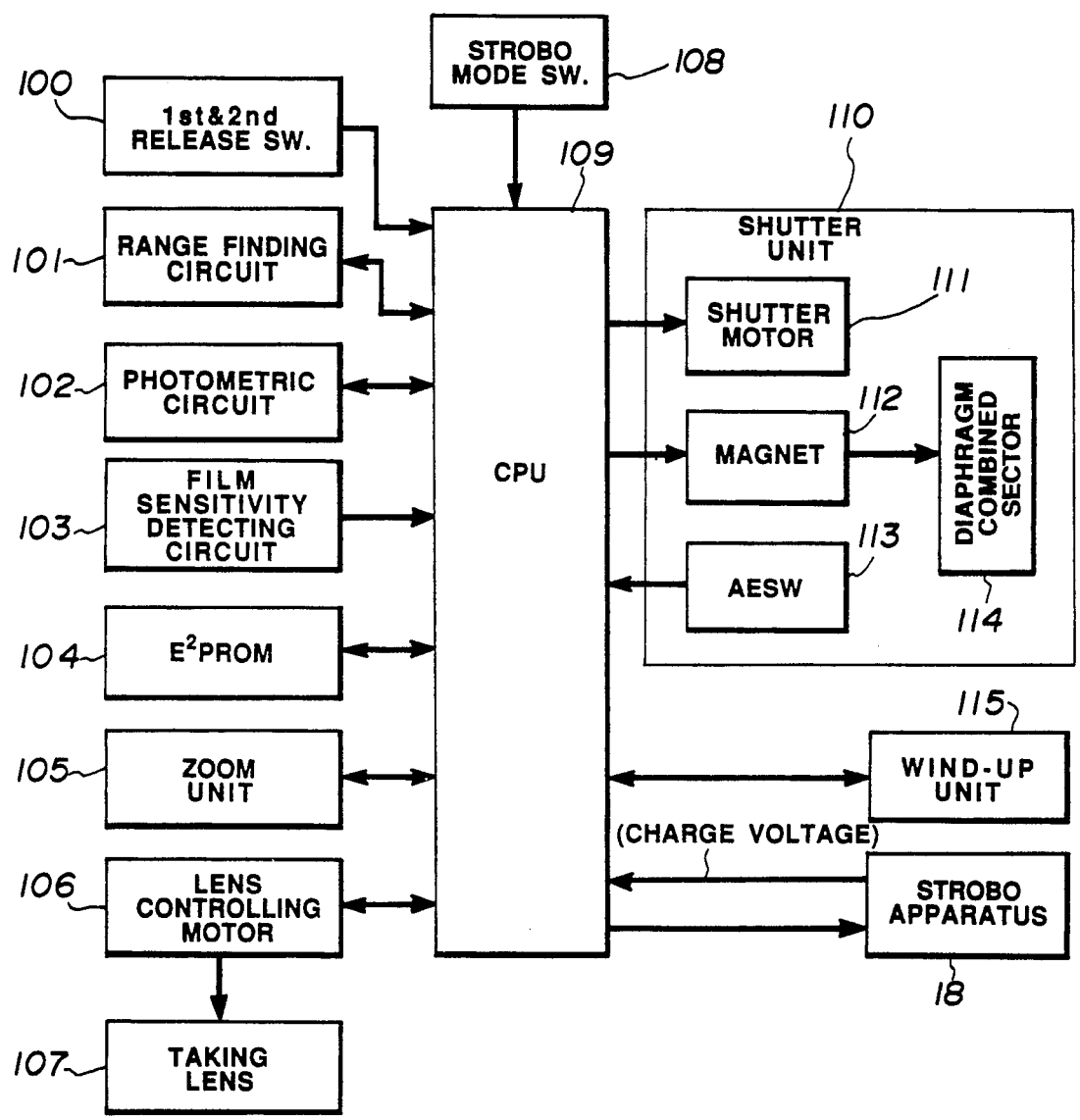

FIG. 3 is a block diagram of a camera to which the strobe controlling apparatus 1 of the above-mentioned embodiment is applied. In this camera, a CPU 109 controls respective units and has the above-mentioned strobe controlling apparatus 1 built-in.

A strobe mode switch 108 is a switch for switching modes relating to the strobe, that is, a normal mode, red eye reducing mode, forced flash mode and strobe off mode. A range finding circuit 101 having a range finding means (see FIG. 5) is provided to take in the distance information of an object to be photographed and a photometric circuit 102 is provided to take in the luminance information of the object. A film sensitivity detecting circuit 103 which is a film sensitivity detecting means 3 is provided to detect the film sensitivity from a DX code of the film being used.

In an E2 PROM 104 having the above-mentioned GV value memorizing means 2 and first and second flash data memorizing means 12 and 15 built-in, not only the above-mentioned data but also various investigation data and such data as the number of exposed frames of a film are memorized and will be held even if the battery is discharged because the E2 PROM 104 is a nonvolatile memory.

A zoom unit 105 varies the focal distance of a taking lens 107 and outputs the zoom value information to the CPU 109. Further, a lens controlling motor 106 drives the taking lens 107. A strobe apparatus 18 has the charge and flash controlled by the CPU 109 and outputs a charge voltage to the CPU 109.

The first and second release switches 100 instruct the preparation and start of the exposure, When the exposure start is instructed, a sector shutter 110 will start moving to start the exposure. With the end of the exposure, a diaphragm combined sector 114 will be closed by a magnet 112. A wind-up unit 115 winds up the film after the end of photographing and also unwinds the film.

In this camera, the exposure is controlled between the CPU 109 and sector shutter 110, That is to say, the CPU 109 controls a shutter motor 111 and magnet 112 and an AESW 113 is switched on/off by the opening starting of the diaphragm combined sector 114 based on the driving of the shutter motor 111 and magnet 112. The on/off signal is input into the CPU 109 and, at the time of the strobe flashing, the strobe will flash on the basis of the result determined by the strobe controlling apparatus 1.

Figure 4:
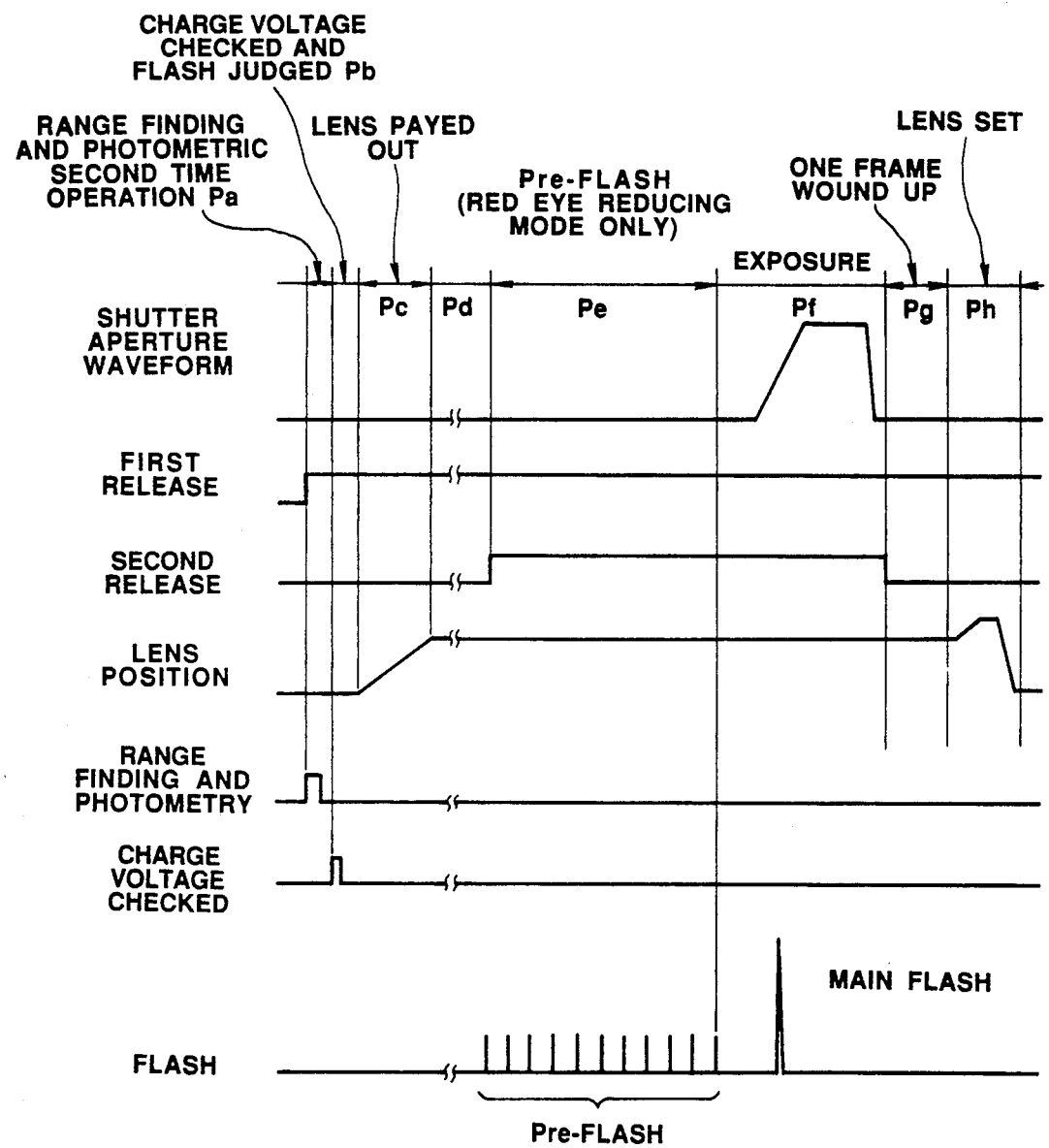
FIG. 4 is a timing chart of a series of camera operations after the release in the above-mentioned camera in FIG. 3.
Figure 5:
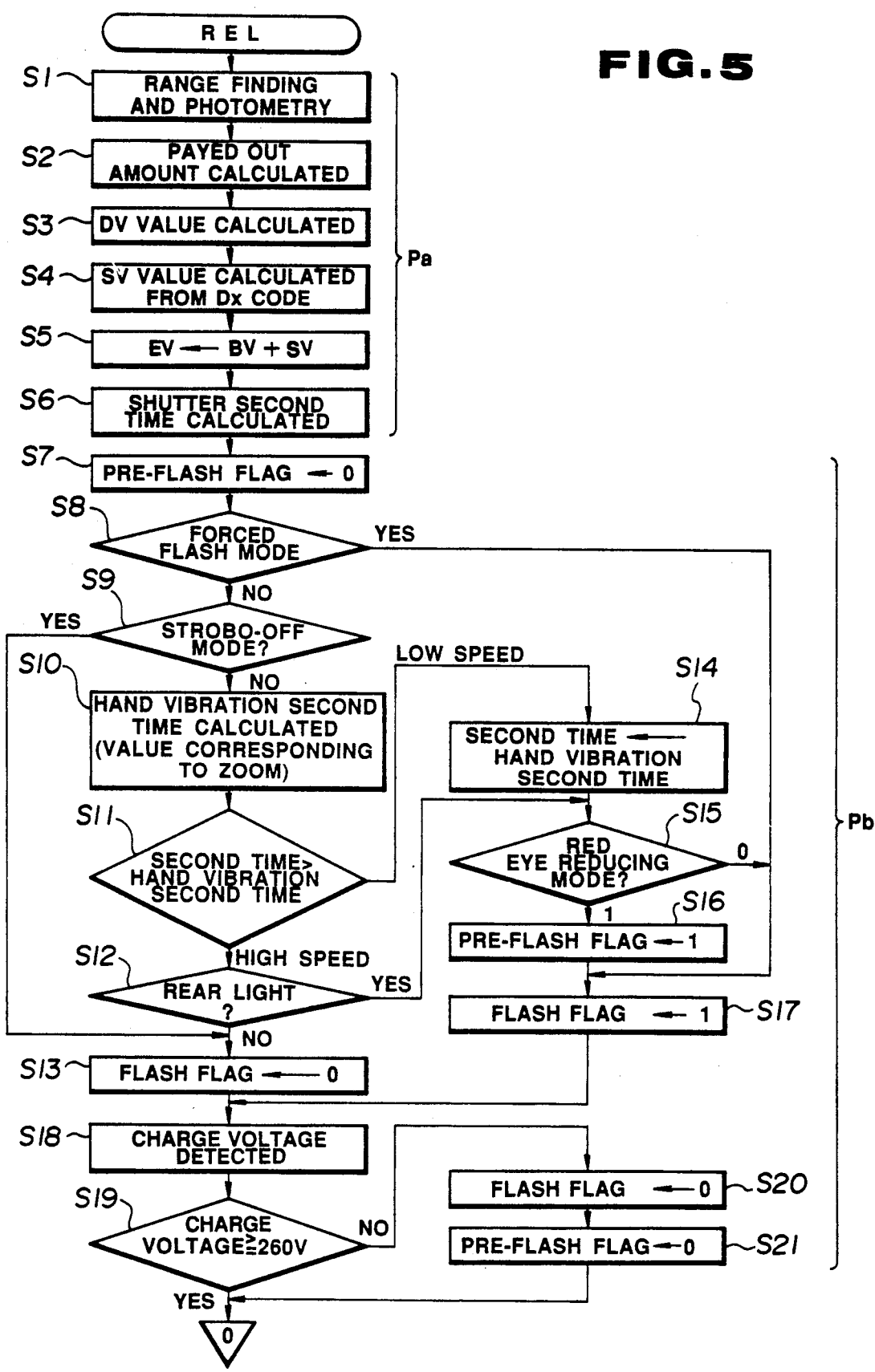
FIGS. 5 and 6 are flow charts of a photographing process "REL" in the above-mentioned camera in FIG. 4.
Figure 6:
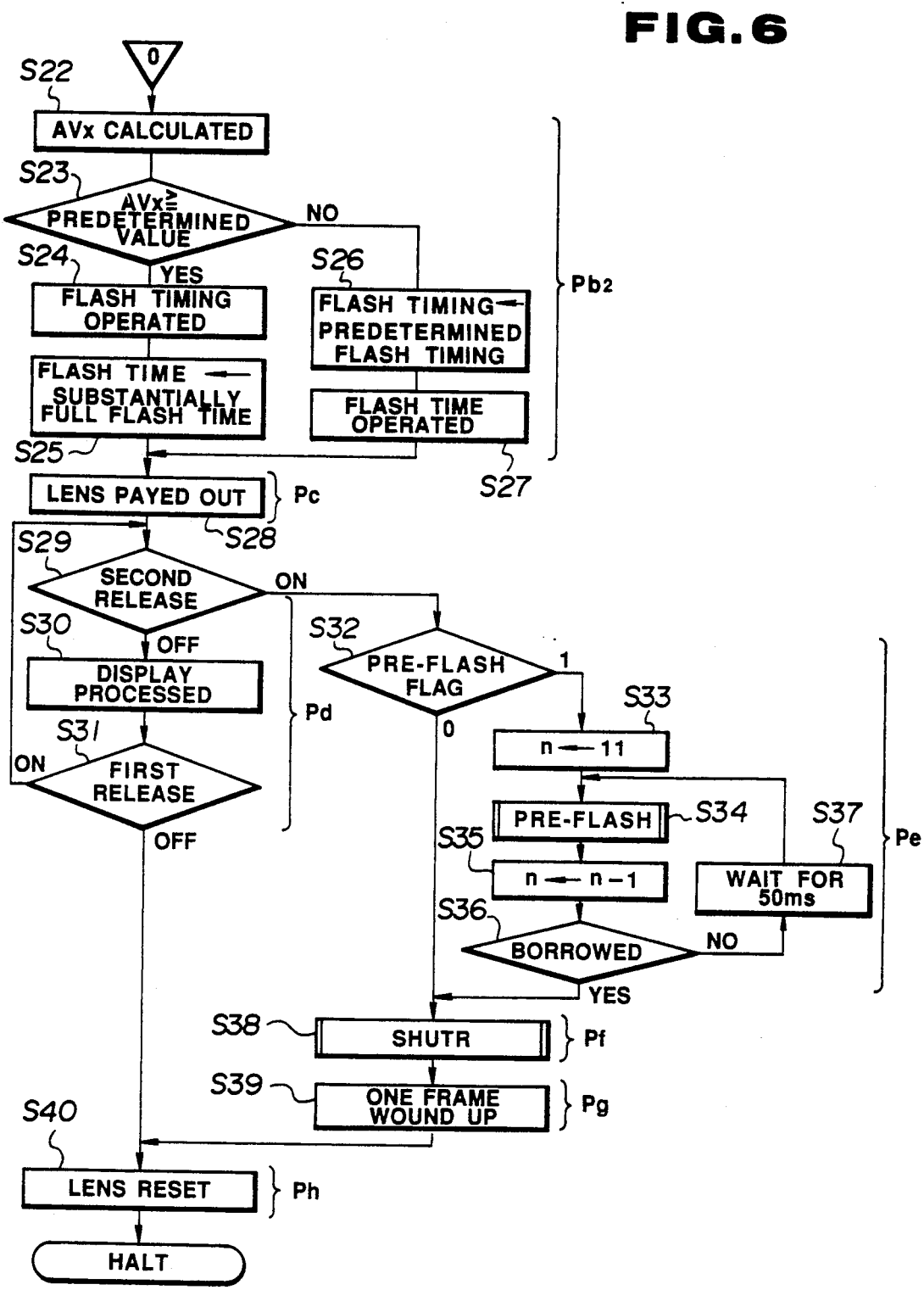

The operation of this embodiment formed as in the above description shall be explained in the following with the timing charts and flow charts in and after FIG. 4. FIG. 4 shows a timing chart of a series of camera operations after the release and FIGS. 5 and 6 show a flow a diagram "REL" after the first release. In FIG. 5, when the first release switch 100 is pushed, the program "REL" will be carried out. First of all, a range finding and photometry (step S1)) will be made by the range finding circuit 101 and photometric circuit 102, a payed out amount for focusing the lens will be calculated (step S2), the DV (=$\log_2 D^2$) value will be calculated (step S3) from the range finding data D, the DX code of the film will be read out by the film sensitivity detecting circuit 103 and the SV value (step S4) will be calculated from the DX code. The exposure amount EV will be determined (step S5) from the photometric value BV and film sensitivity SV and the second time will be calculated (step S 6) on the basis of this EV value. The process in these steps S1 to S6 corresponds to the process Pa of the range finding, photometry and second time operation shown in FIG. 4.

Now, the flow of the steps S7 to S27 corresponding to the process Pb of the charge voltage check and flash judgment shown in the time chart in FIG. 4 comprises the steps S7 to S21 of judging the flash (process Pb1) and the steps S22 to S27 of calculating the flash timing and flash time (process Pb2). This camera has four strobe modes, that is, a forced flash mode, strobe off mode, red eye reducing mode and normal mode selected and designated by a strobe mode switch 108. The flash flag will be 1 (i.e. binary 1) when a main flash is made but will be 0 when no main flash is made. The preflash flag will be 1 when a preflash is made but will be 0 when no preflash is made.

In the process Pb1 comprising the steps S7 to S21 in FIG. 5, the flash will be judged and will be determined as shown in the following Table 1, which should be arranged side-by-side.

TABLE 1

Flash Judgment

| Conditions | | | |
|---|---|---|---|
| Strobo mode | Second time is from hand vibrated second time | Rear light? | Charge voltage ≧260? |
| Normal or red eye reducing mode | High speed | Normal light | |
| | | Rear light | No |
| | | | Yes |
| | Low speed | | No |
| | | | Yes |
| Forced flash mode | | | No |
| | | | Yes |
| Strobe off | | | |

| Results | | |
|---|---|---|
| Flash flag | Second time | Remarks |
| 0 | | |
| 0 | As it is | |
| 1 | | Pre-flash flag ← 1* |
| 0 | Hand vibrated second time | |
| 1 | | Pre-flash flag ← 1* |
| 0 | As it is | |
| 1 | | |
| 0 | As it is | |

*: at the time of the red eye reducing mode.

That is to say, at the time of a normal mode or red eye reducing mode, if the shutter second time determined from the EV value is faster than the hand vibrated second time (second time when a hand vibration is likely to be caused usually by the reciprocal of the focal distance) and the light is normal, the flash flag will be made 0, if the light is recir and the charge voltage is above 260 V, the flash flag will be made 1 and, at the time of the red eye reducing mode, the preflash flag will be made 1. On the other hand, when the shutter second time is a low speed, the second time will be rounded to be a hand vibrated second time (step S14). If the charge voltage is above 260 V, the flash flag will be made 1. At the time of the red eye reducing mode, the preflash flag will be made 1. The forced flash mode will be judged by the charge voltage and, when it is above 260 V, the flash flag will be made 1. At the time of the strobe off mode, the flash flag will remain 0.

In the process Pb2 comprising the steps S22 to S27 in FIG. 6, the flash timing and flash time are calculated. This is a point of the present invention. The details of the calculation shall be described later and therefore here the flow diagram shall be briefly explained. In consideration of an amended value Ca1 by the charge voltage for the flash and an amended value Ca2 by the preflash (described later), a judged diaphragm value $AVx (=GVm+SV-DV-Ca1-Ca2)$ is calculated by a judged value operating means 7 (step S22) and it is judged whether this value is larger than a predetermined value (step S23) to thereby judge in which of the regions Rg5, Rg6 and Rg4 the flash region is located in the FMv diagram in FIG. 2. If the AVx value is below the predetermined value (regions Rg5 and Rg6), that is, on the long distance side, the flash timing will be operated (step S24) from GVm, SV and DV by the first operating means and the diaphragm will be thereby controlled. At this time, the flash time will be made a substantially full flash time (step S25). If the diaphragm value AVx is above the predetermined value (region Rg4), that is, on the short distance side, the flash timing will be made a predetermined flash timing (step S26) and then the flash time will be operated (step S27) from SV and DV by the second operating means to thereby control the GNo of the strobe.

Then, in the step S28, the photographing lens 107 is payed out by the lens controlling motor 106. In the period of the process Pd of the steps S29 to S31, while the display is being processed, the process (steps S29, S30 and S31) will stand by until the second release switch 100 is on. In this period of standing by, if the first release is switched off (step S31), the lens will be reset (step S40) and the process will HALT to stand by.

Returning to the above-mentioned step S29, when the second release switch 100 is switched on, the process will proceed (process Pe) to the preflash (only at the time of the red eye reducing mode) comprising the steps S32 to S37. That is to say, the preflash flag will be checked (step S32). If the preflash flag is 1, (n+1) times (steps S35 and S36) of the preflash will be made (step S34) at the intervals of 50 ms (step S37). By the way, in this embodiment, n=11 (step S33). By this preflash, it is prevented to make the pupil of the eye of the object person small and to generate a red eye phenomenon. The red eye prevention by this preflash is mentioned in detail in U.S. Ser. No. 446,400 now U.S. Pat. No. 4,999,663, issued Mar. 12, 1991 and therefore shall not be explained here. The sub-routine "PRE-FLASH" of the above-mentioned step S34 shall be described later with reference to FIG. 10.

In the exposing process Pf of the step S38, the exposing operation of the shutter unit 110 is made by the sub-routine "SHUTR" which shall be particularly described by the later-mentioned FIGS. 7 and 8. Next, one frame is wound up (process Pg) in the step S39 and then the lens is reset (process Ph) to "HALT" the process to stand by. This "HALT" is released by the first release or mode switching switch.

Figure 7:
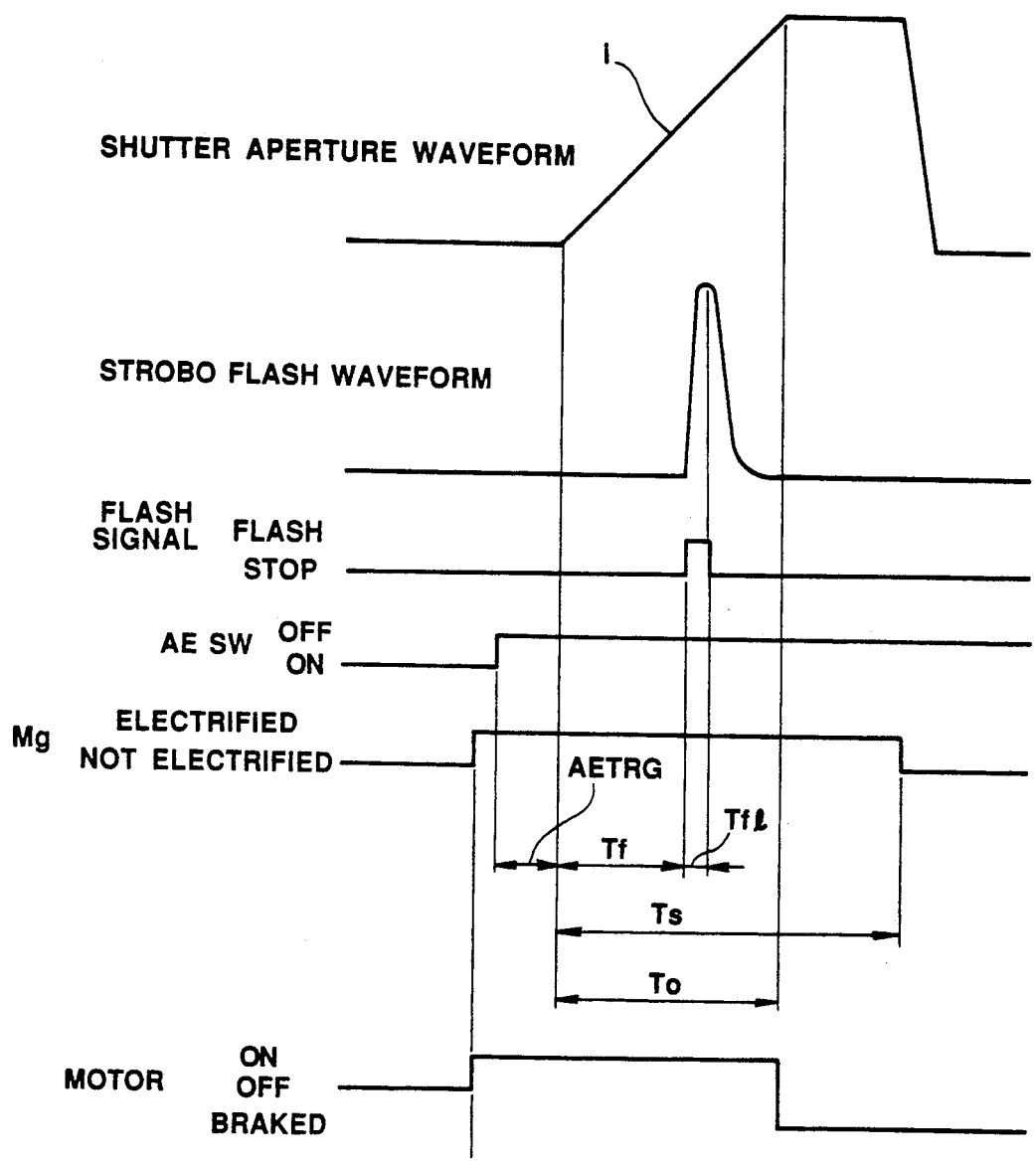
FIG. 7 is a timing chart of an exposing operation in the above-mentioned FIGS. 5 and 6.
Figure 8:
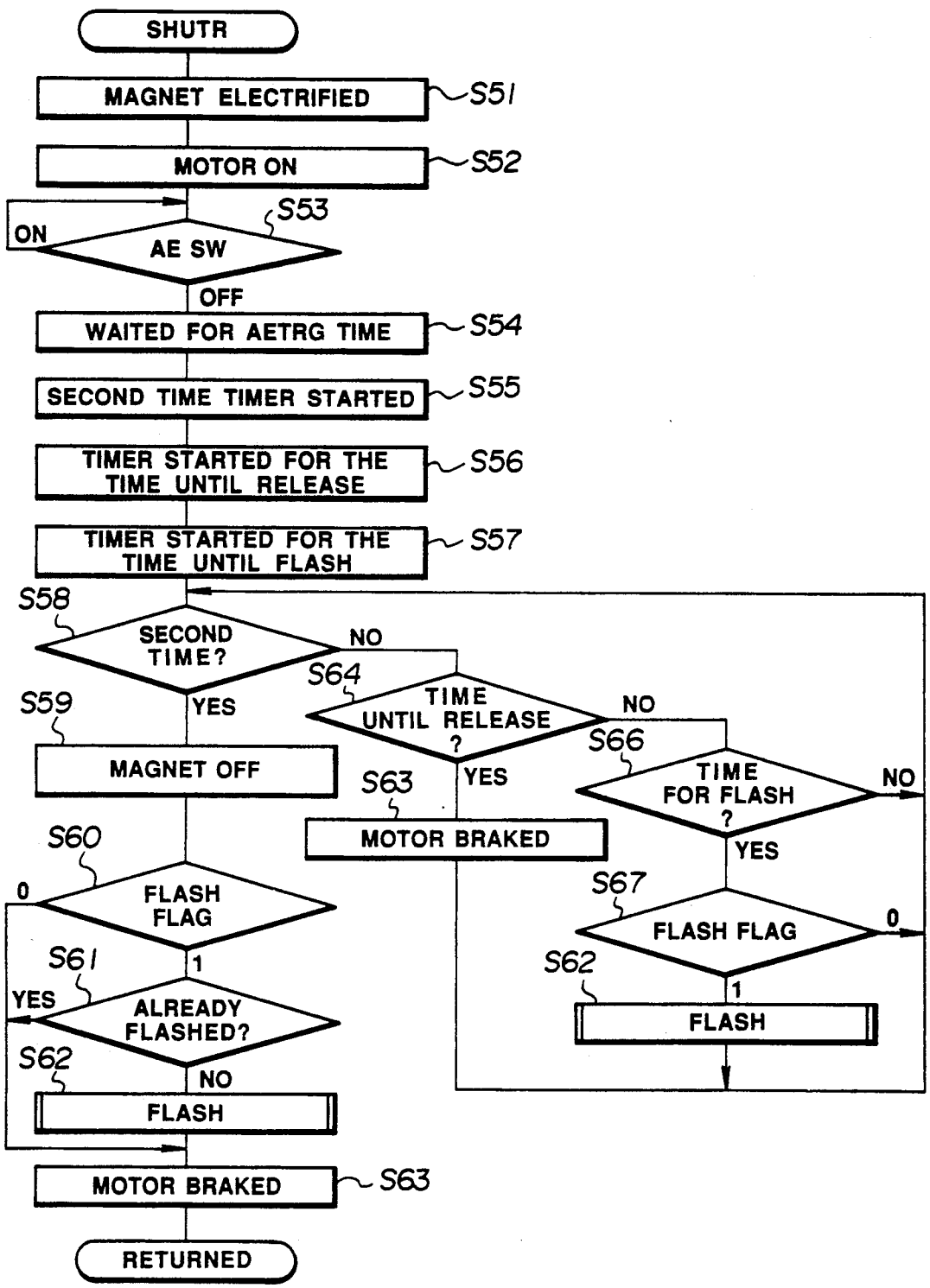
FIG. 8 is a flow chart of an exposing process sub-routine "SHUTR" in the above-mentioned FIG. 6.

Now, the sub-routine "SHUTR" showing the exposing operation of the step S38 in the above-mentioned FIG. 6 shall be explained with FIG. 7 showing the operation timing and FIG. 8 showing the flow diagram. In FIG. 8, first of all, the magnet 112 is electrified (step S51) and the shutter motor 111 is switched on (step S52). The process stands by (step S53) until the switch AESW 113 detecting the timing of opening the shutter of the diaphragm combined sector 114 is switched off and stands by (step S53) from the time when the AESW 113 is switched off until the sector 114 actually opens. Here, the times Ts, To and Tf after the sector 114 of the shutter shown in FIG. 7 begins to open respectively show that Ts represents the second time until the magnet 112 is switched off, To represents the time until the sector 114 is opened, Tf represents the time until flashing and Tfl represents the flash time.

As shown in FIG. 8, after standing by for the AETRG time after the AESW 113 is switched off, the second time timer (Ts time timer), the time until the release (To time timer) and the time until the flash (Tf time timer) are respectively started (step S55 to S57). Thereafter, three judgments shown in the steps S58, S64 and S66, that is, as to whether the second time is made (step S58), whether the time until the release is made (step S64) and whether the flash time is made (step S66) are respectively sequentially made.

Which comes first of the times Ts, To and Tf after the shutter shown in FIG. 7 begins to open depends on the operation result but there shall be considered a case that a strobe is flashed in the region in which the diaphragm value varies with the aperture of the shutter blade, that is, the triangular aperture region in which the shutter aperture waveform shown in FIG. 7 is represented by a rightward rising (i.e., diagonal) straight line i and the second time Ts until the magnet 112 is switched off is longer than the time until the release. In such case, if the flash time is made at first (step S66) and the flash flag is 1 (step S67), the main flash will be made (step S62) by the sub-routine "FLASH" explained in the later described FIG. 9. Then, the release time is made (step S64) and the motor 111 is braked (step S63). Further, the second time when the magnet Mg is switched off is made (step S58), the magnet is switched off (step S59) and the shutter closes. Here, the flash flag is 1 (step S60) but, if it has already flashed (step S61), the main flash in "FLASH" (step S62) will not be made and the motor 111 will be braked (step S63). The case that the time of the three timers is reversed can be easily thought of in the flow diagram in FIG. 8 and therefore shall not be explained here.

Figure 9:
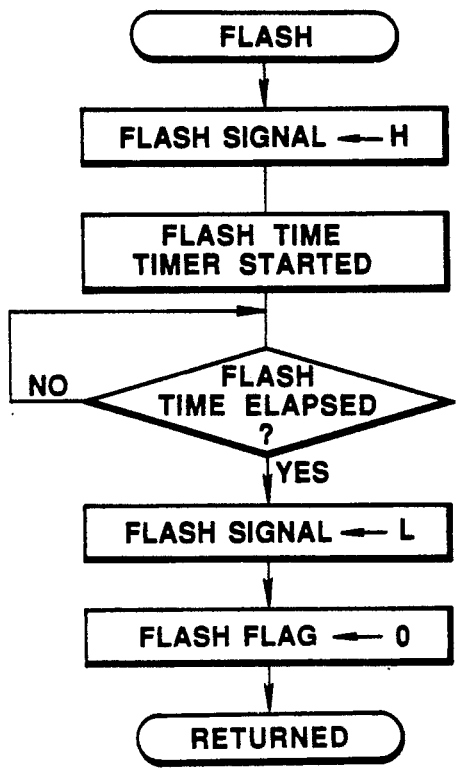
FIG. 9 is a flow chart of a sub-routine "FLASH" in the above-mentioned FIG. 8.

FIG. 9 is a flow diagram showing the details of the sub-routine "FLASH" of the step S62 in the above-mentioned FIG. 8. In this sub-routine "FLASH", as shown in the diagram, the main flash is made only for the flash time Tf1 (See FIG. 7) by using the flash time timer and the flash flag is made 0.

Figure 10:
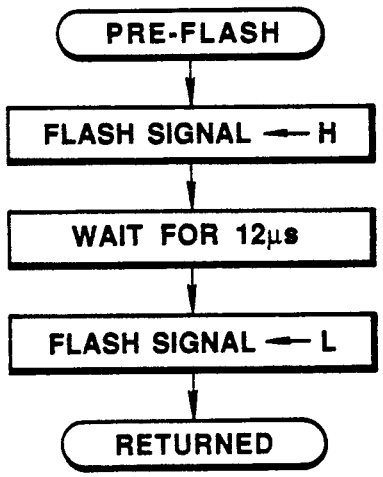
FIG. 10 is a flow chart of a sub-routine "PRE-FLASH" in the above-mentioned FIG. 6.

FIG. 10 is of a flow diagram showing the details of the sub-routine "PREFLASH" of the step S34 in the above-mentioned FIG. 6. In this sub-routine "PRE-FLASH" as shown in the diagram, the preflash for preventing the red eye phenomenon is made only for 12 μs.

Figure 11:
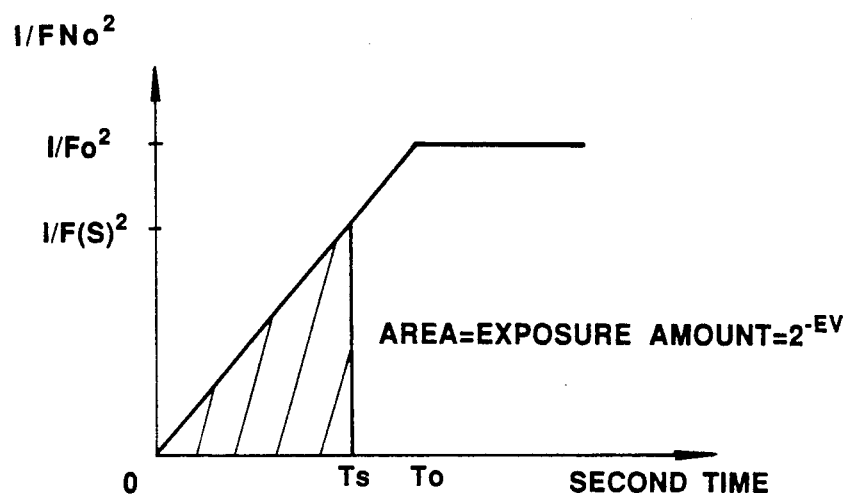
FIGS. 11 and 12 are characteristic diagrams each showing the variation of an exposure amount by an exposure value (diaphragm) and exposure second time.

Here, the case that the actual shutter second time is determined from the relation between the exposed value EV and the apex operated second time shall be explained. If the second time to be determined is represented by Ts, in the triangular region, the area of the hatched part shown in FIG. 11 will represent the exposed amount and the relation with the EV value represented by the following formula:

$$EV = BV + SV \quad (9)$$

will be:

$$\text{Area of hatched part} = \text{Exposed amount} = 2^{-EV}$$

wherein $2^{-EV}$ can be represented from FIG. 11 by:

$$\begin{aligned}
2^{-EV} &= (1/2) \cdot Ts \cdot (1/F(S)^2) \\
&= (1/2) \cdot Ts \cdot (Ts/To) \cdot (1/Fo^2) \\
&= (1/2) \cdot (1/Fo^2) \cdot (1/To) \cdot Ts^2
\end{aligned}$$

wherein F(S) represents a diaphragm amount at the second time Ts and Fo represents a diaphragm amount when the shutter is opened.

When the logarithms of both sides of the above formula are taken and arranged, $$EV = \log_2 Fo^2 - 2 \cdot \log_2 Ts + \log_2 To - 1 \quad (10)$$

will be made.

From the conversion formula of the apex operation, if the diaphragm value is represented by AV and the opened AV value is represented by AVo, $$AVo = \log_2 Fo^2 \quad (11)$$

will be made.

Also, if the shutter second time value is represented by TV and the TV value of ½ the second time is represented by TVs, $$\begin{aligned}
TVs &= \log_2 (2/Ts) \\
&= 1 - \log_2 Ts
\end{aligned}$$

will be made.

Further, if the TV value of ½ the time until the shutter is opened is represented by TVo, $$\begin{aligned}
TVo &= \log_2 (2/To) \\
&= 1 - \log_2 To
\end{aligned}$$

will be made.

When these are substituted in the above-mentioned formula (10), $$TVs \doteq \tfrac{1}{2}(EV - AVo + TVo) \quad (12)$$

$$Ts = 2^{(1-TVs)} \quad (13)$$

Figure 12:
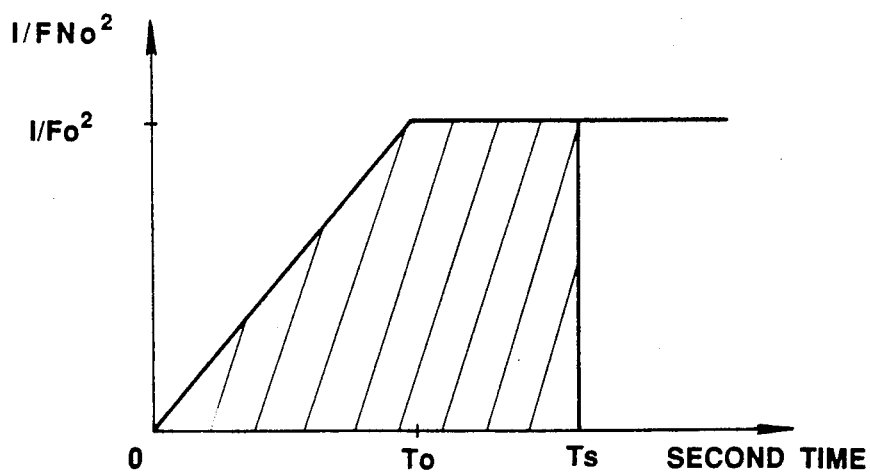

On the other hand, in the trapezoidal region, from the area of the hatched part shown in FIG. 12 = $2^{-EV}$, it can be represented by $$2^{-EV} = (\tfrac{1}{2}) \cdot (2Ts - To) \cdot 1/Fo^2$$

When the logarithms of both sides of this formula are taken and arranged, $$EV = \log_2 Fo^2 - \log_2 (2Ts - To) + 1$$

will be made.

When the above-mentioned formula (11) is substituted in this formula, $$TVs = EV - AVo \quad (14)$$

$$Ts = (\tfrac{1}{2}) \cdot \{2^{(1-TVs)} + To\} \quad (15)$$

will be respectively obtained.

As the triangular region and trapezoidal region are connected with each other, the exposure value EV of the γ conversion point can be determined by erasing the TVs value from the above-mentioned formulae (12) and (14). That is to say, in the triangular region, $$EV \geq AVo + TVo \quad (16)$$

and, in the trapezoidal region, $$EV \leq AVo + TVo \quad (17)$$

In the case of this embodiment, the value TVsft for amending the TV value until the opening and the value EVsft for amending the exposed value are memorized in the E²PROM 104 so that the respective amendments may be made at the time of the operation.

From the above, the second time is operated as

1) The exposure value EV is calculated by the following formula:

$$EV = BV + SV + EVsft$$

2) The region is judged by the following formulae:

$$EV \geq AVo + (TVo + TVsft)$$

is judged to be of the triangular region and $$EV \leq AVo + (TVo + TVsft)$$

is judged to be of the trapezoidal region.

3) The second time of the opening is operated by the following formula:

$$To = 2^{(1-TVo-TVsft)}$$

4) The second time at the time of the triangular region is operated by the following formula:

$$Ts = 2^{(1-TVs)}$$

wherein the TVs value is determined by the following formula:

$$TVs = (\tfrac{1}{2}) \cdot (EV - AVo + TVo + TVsft)$$

5) The second time at the time of the trapezoidal region is operated by the following formula:

$$Ts = (\tfrac{1}{2}) \cdot (2^{(1-TVs)} - To)$$

wherein the TVs value is determined by the following formula:

$$TVs = EV - AVo$$

Thus, in case the photometric value, that is, the objective luminance is under or over as a whole or when the lens is darker or brighter than the designed value, at the time of adjusting them in the factory, the value of EVsft for amending them will be written into the E²PROM.

Figure 13:
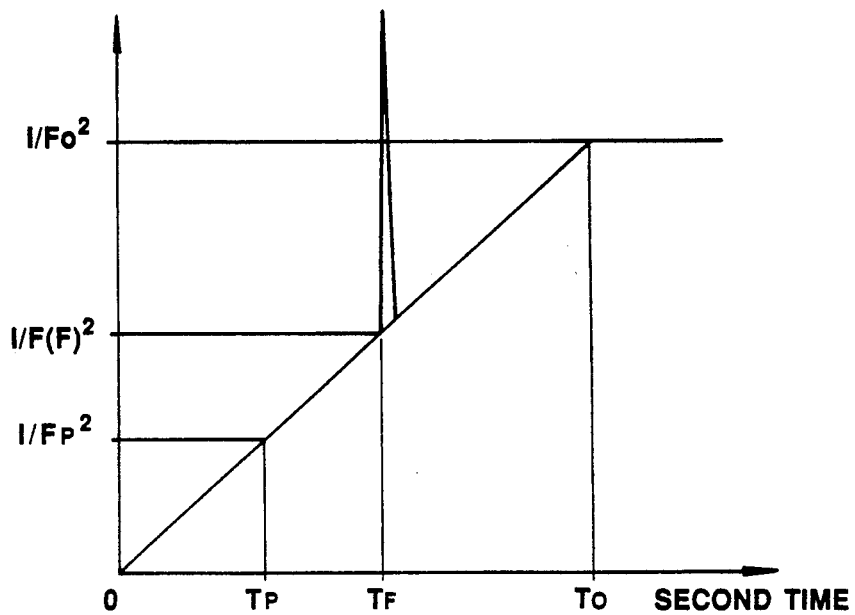
FIGS. 13 and 14 are characteristic diagrams each showing the variation of an exposure amount by an exposure value (diaphragm) at the time of strobe flashing and exposure second time.
Figure 14:
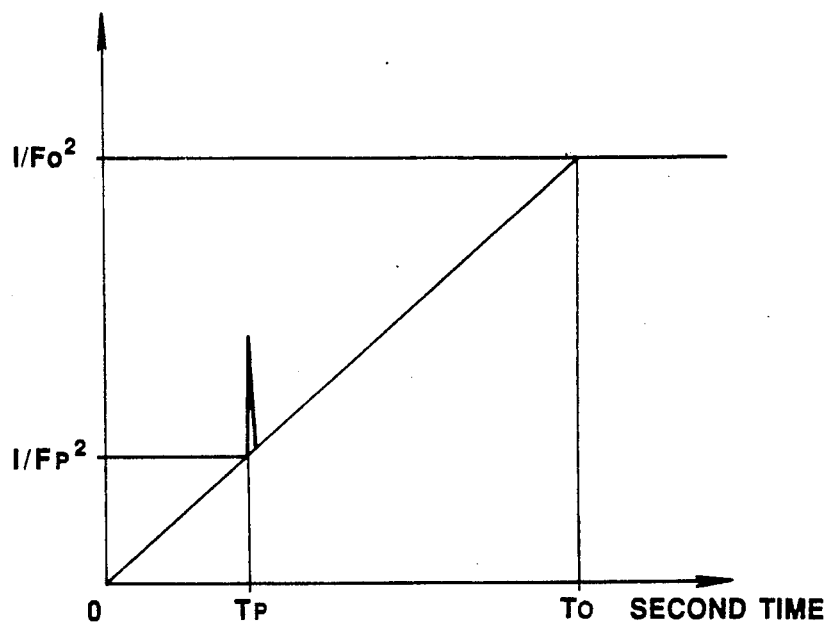
Figure 15:
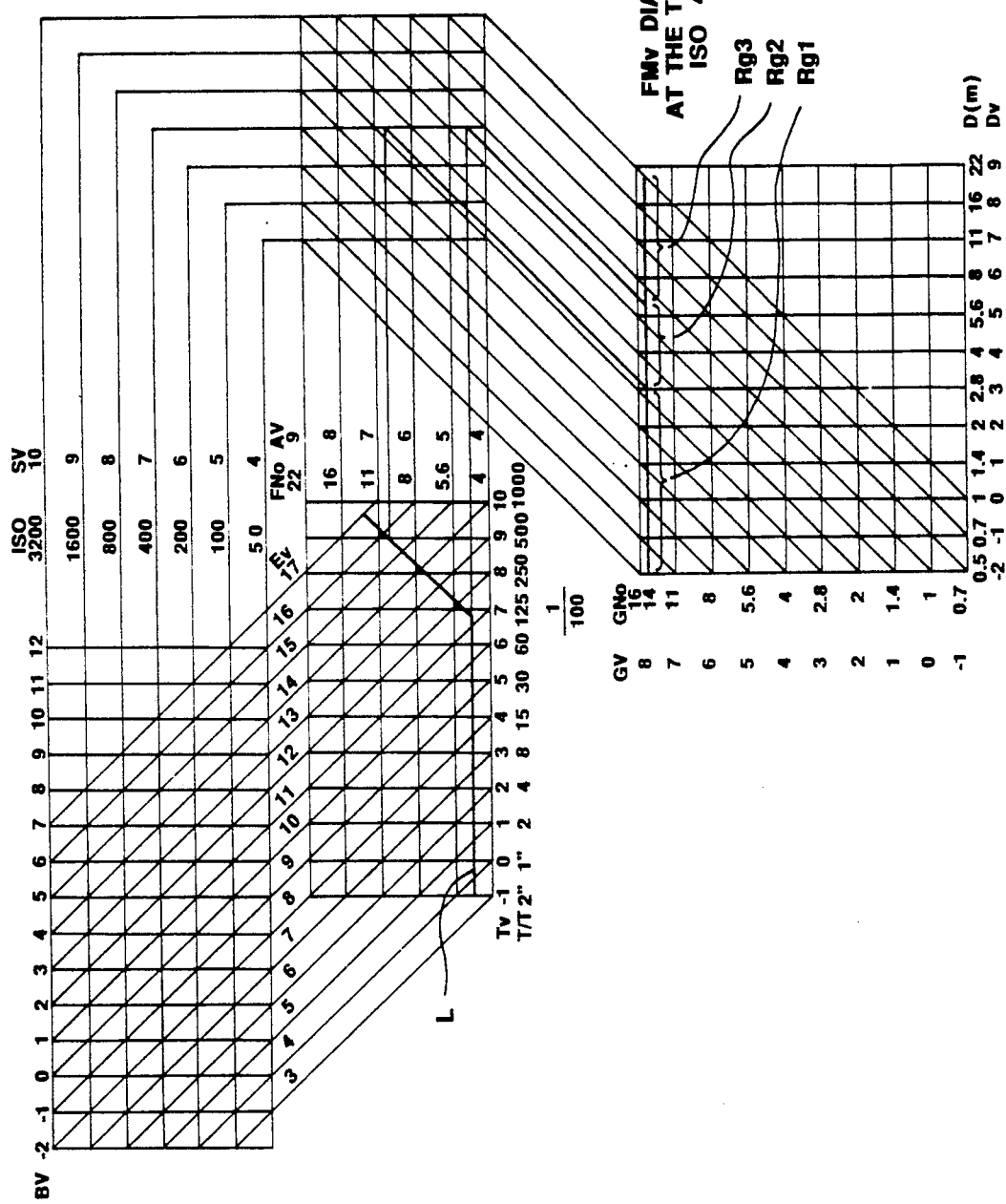
FIG. 15 is an FMv diagram for determining a proper exposure condition of a camera having conventional strobe controlling apparatus.

The FM system of the present invention shall be explained in the following with reference to FIGS. 13 and 14. The FMv diagram is shown in FIG. 2. When a low ISO sensitivity film is used or the object is at a long distance, a full flash will be made at the opening, that is, in the region Rg6 in FIG. 2. At the time of a short distance or a high ISO sensitivity, the flash will remain full, will change the flash point and will flash before the diaphragm is fully opened, that is, in the region Rg5 in FIG. 2. If the shutter is close to the opening, even if the flash timing lags more or less, the diaphragm step number AV value will not be so much influenced but, if the diaphragm is throttled, even a small lag of the flash timing will have a great influence on the diaphragm step number AV value.

Generally, as the opening speed and opening timing vary depending on the mechanical errors of the shutter itself, the battery voltage and the temperature, when the FM is controlled by large throttling, the exposure errors will increase. Therefore, in this embodiment, the diaphragm is throttled by changing the flash point until the shutter speed is 1/500 second but the flash is not made above that speed. Further, at a short distance or high ISO, the strobe flash time is made short and the strobe GNo is thereby made small to make a proper exposure, that is, in the region Rg4 in FIG. 2. Only the FMv diagram of ISO 400 is mentioned in FIG. 2 but the films of other ISO sensitivities are also the same.

The operating system of the FM system of this embodiment shall be explained in the following. Controls in two steps of an FNo control controlling the diaphragm and a GNo control controlling the flash amount are made to expand the region satisfying the above-mentioned formula (3) for making the exposure by the strobe light proper. First of all, whether operation will be in the region Rg4 or Rg5 in FIG. 2 is judged. In FIG. 2, at the switching point, AV = 6.7 and TV = 9 (second time 1/500).

The AV value and TV value at this switching point vary with the character of the camera and therefore shall be respectively AVp and TVp. The GV value at the time of a full flash is GVm. Therefore, if these are substituted in the formula (7), $$GVm = AVp + DV - SV + 5$$

will be made. If the above formula is arranged, $$GVm + SV - DV = AVp + 5$$

will be made. Therefore, the judgment of the region will be, in the FNo controlling regions (Rg5 and Rg6) of the diaphragm control, $$GVm + SV - DV \leq AVp + 5 \quad (18)$$

and, in the GNo controlling region (Rg4) of the flash amount control, $$GVm + SV - DV > AVp + 5 \quad (19)$$

When the strobe charge voltage is high enough to make a substantially full flash, the above-mentioned formulae (18) and (19) will do but, in fact, the charge voltage may be too low to make a substantially full flash. Therefore, in this embodiment, at the time of the release, a full charge will not be made by making a charge again when not fully charged in order to prefer the release timing but, instead, when the charge voltage is low, the GV value at the time of the full flash at this voltage will be substituted for GVm in the formulae (18) and (19). This value GV may be determined directly from the charge voltage or by subtracting from GVm a correction value corresponding to the charge voltage. This correction value can be directly determined by the characteristic of the strobe apparatus and, if there are tables of charge voltages and correction values, the correction will be able to be easily made. By the way, as described above, the above-mentioned charge voltage correction value shall be Ca1.

Also, in the red eye reducing mode, in the case of strobe flashing, a preflash for reducing the red eye will be made prior to the main flash. If the charge voltage is checked again after this preflash, the charge voltage will be able to be corrected by the above-mentioned charge voltage correction value Ca1 but, in case the charge voltage is checked only prior to the preflash, the reduction of the GV value by the preflash will have to be corrected. If there are tables of charge voltages and correction values, this correction value will also be able to be easily corrected. By the way, as described above, the above-mentioned preflash correction value shall be Ca2. That is to say, the GV value at the time of the full flash of the main flash will be:

$$GV = GVm - Ca1 - Ca2$$

Therefore, the above-mentioned formulae (18) and (19) will be, in the FNo controlling regions (Rg5 and Rg6), $$AVx \leq AVp + 5 \qquad (20)$$

and, in the GNo controlling region (Rg4), $$AVx > AVp + 5 \qquad (21)$$

which can be arranged to be $$AVX = GVm - Ca1 - Ca2 + SV - DV \qquad (22)$$

In the case of this camera, by the zoom, as shown in FIG. 2, there are wide, tele and macro ranges and the AV value of the function is made different by the zoom. The switching point of FNo and GNo is determined by the TV value of 9 (1/500 in second time) but not by the AV value. Therefore, the fixed value AVp+5 of the formulae (20) and (21) is changed to an expression in the TV value. As they are of similar forms in FIG. 14, $$1 / (Fo^2) : 1 / (Fp^2) = To : Tp$$

Therefore, $$Fp^2 = (To/Tp) \cdot (Fo^2)$$

will be made. By taking the logarithms of both sides, $$\log_2 (Fp^2) = \log_2 To - \log_2 Tp + \log_2 (Fo^2)$$

will be made. Here, if $$TVo = 1 - \log_2 To$$

$$TVp = 1 - \log_2 Tp$$

$$AVo = \log_2 Fo^2 \text{ and}$$

$$AVp = \log_2 Fp^2$$

are substituted in the above formula, $$\begin{aligned} AVp &= -TVo + TVp + AVo \\ &= TVp - TVo + AVo \end{aligned} \qquad (23)$$

will be made. If this formula (23) is substituted in the above-mentioned formulae (20) and (21), the relation between the judged diaphragm value AVx and predetermined value Nx will be, in the FNo controlling regions (Rg5 and Rg6).

$$AVx \leq Nx \qquad (24)$$

and, in the GNo controlling region (Rg4), $$AVx > Nx \qquad (25)$$

wherein the judged diaphragm value AVx and predetermined value Nx are respectively $$AVx = GVm - Ca1 - Ca2 + SV - DV \qquad (26)$$

$$Nx = TVp - TVo + AVo + 5 \qquad (27)$$

By the way, Nx is of a fixed value determined by each zoom.

In this camera, TVo and AVo vary with the zoom value but TVp is fixed at 9. Needless to say, this value will be the same even if varied by the zoom.

The respective regions shall be operated in the following. First of all, in the regions Rg5 and Rg6, a full flash is made and required is a flash timing. By substituting TVf for TVp in the formula (23), $$GVm - Ca1 - Ca2 + SV - DV = TVf - TVo + AVo + 5$$

is made. From this and the second time Tf until flashing $= 2^{(1-TVf)}$, the following formula is made:

$$TVf = GVm - Ca1 - Ca2 + SV - DV + TVo - AVo - 5$$

$$Tf = 2^{(1-TVf)}$$

By this formula, the time until flashing is determined. It is needless to say that, if this time is longer than the opening time To, it will be rounded in the opening time To.

On the other hand, in the region Rg4, the flash timing is Tp and the flash time is determined. First of all, the case of being fully charged shall be considered. When GVm is made GVf (GV value at the time of flashing) and the correction value is removed in the formula (26), $$GVf = DV - SV + TVp - TVo + AVo + 5$$

will be made. The flash time to be GVf is determined by the charge voltage and whether a preflash is made or not. Ideally there may be a charge voltage and a relative formula of GVf by whether there is a preflash or not and the flash time or respective charge voltages and a tape of GVf by whether there is a preflash or not and the flash time. In fact, in order to carry it out, complicated calculations . and voluminous ROM data are required. Therefore, in this embodiment, only one table of the GV values at the time of full charging and flash time is kept, when the charge voltage is low, the charge voltage correcting value (charge voltage correcting value Cb1) will be added to the required GV value, further, when a preflash is to be made, the preflash correcting value (preflash correcting value Cb2) will be added, when the GVf' which is a corrected GV value is determined, it will be $$GVf' = DV - SV + TVp - TVo + AVo + 5 + Ca1 + Ca2 \qquad (28)$$

and the flash time is determined from the GVf' value with reference to the table.

In the case of either of the FNo control and GNo control, if the flash timing is later than the shutter second time, it will have no significance and therefore then the flash timing shall be the shutter second time. That is to say, if $Tf \geq Ts$, Tf will be made equal to Ts.

When this is shown by the TV value, if TVf≦TVs, TVf will be made equal to TVs.
Also, at this time, it will be necessary to re-determine the flash time on the basis of this timing. In the formula (28), with TVp=TVs, $$GVf = DV - SV + TVs - TVo + AVo + 5 + Cb1 + Cb2$$

is determined and, from this GVf, the flash time is determined with reference to the table. The flash timing shall be the second time Ts.

The FM control of this embodiment is made by the above calculations.

Generally, the shorter the strobe flash time, the larger the reduction of the GV value by the reduction of the charge voltage. Therefore, it is not proper to make the charge voltage correction (Cb1) and preflash correction (Cb2) with only the charge voltage. Therefore, in this embodiment, the correction value is determined by a matrix of the required GV and charge voltage. Thereby, with only one table of the GV value and flash time, an FM control very high in precision can be realized.

Summarizing the above, the FM operation is made as follows:
1) Judgment of the regions:
   When AVx≦Nx, FNo controlling region.
   When AVx>Nx, GNo controlling region.
The above-mentioned AVx value and Nx value are:

$$AVx = GVm - Ca1 - Ca2 + SV - DV$$

$$Nx = TVp - TVo + AVo + 5$$

2) Flash time and flash timing in the FNo controlling region:
   The flash time shall be a substantially full flash time.
   The flash timing shall be $2^{(1-TVf)}$ wherein the TVf value is by the following formula:

$$TVf = GVm - Ca1 - Ca2 + SV - DV + TVo - AVo - 5$$

However, when the flash timing is later than the opening second time, the flash timing shall be the opening timing.

3) Flash time and flash timing in the GNo controlling region:
   The flash time is determined from GVf with reference to the table (of the GV value and flash time). Here, the GVf value shall be:

$$GVf = DV - SV + TVp - TVo + AVo + 5 + Cb1 + Cb2$$

The flash timing shall be Tp by the following formula:

$$Tp = 2^{(1-TVp)}$$

However, when TVs≧TVp, TVp=TVs will be made.

In the above-mentioned FNo controlling region, the flash timing has been operated so that the strobe apparatus may flash at the diaphragm value satisfying the FM system. However, it is needless to say that the diaphragm value may be operated by the above-mentioned formula (2) to control the diaphragm.

A latitude of modification, change and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein described.

What is claimed is:

1. A strobo apparatus and a strobo controlling apparatus therefor whereby, in a performance of a photographing operation, a flash amount can be controlled by controlling a flash time which is a length of time a flash developed by the strobo apparatus is maintained, comprising:
   a gradually opening diaphragm combined sector shutter;
   a memorizing means for memorizing information representing a guide number at a time of a maximum flash of said strobo apparatus;
   a flash timing operating means for determining a first flash timing for the strobo apparatus relative to a time of opening said sector shutter responsive to the guide number at the time of said maximum flash and information representing a film sensitivity, said first flash timing representing a time when the strobo apparatus is initiated to flash;
   a first flash controlling data memorizing means for memorizing data combining said first flash timing and a substantially full flash time of said strobo apparatus, said full flash time representing a time interval of a full flash generated by the strobo apparatus;
   a flash time operating means for determining a second flash timing for said strobo apparatus to obtain a proper exposure responsive to said film sensitivity, and information representing a distance of an object and a predetermined diaphragm value;
   second flash controlling data memorizing means for memorizing data combining information representing said second flash timing and a third flash timing for controlling the strobo apparatus when the sector shutter is operated at said predetermined diaphragm value;
   a judged value operating mans for determining a judged diaphragm value responsive to said film sensitivity, said object distance and said maximum flash time guide number;
   selecting means for selecting data stored in said first flash controlling data memorizing means when said judged diaphragm value is smaller than a predetermined value and for selecting data stored in said second flash controlling data memorizing means when said judged diaphragm value is larger than said predetermined value; and
   flash controlling means for controlling the strobo apparatus responsive to said selecting means.

2. A strobo controlling apparatus according to claim 1 wherein, for determining the flash timing by said flash timing operating means, the guide number at the time of a maximum flash of the strobo apparatus is represented by GVm stored in said memorizing means, the film sensitivity is derived from a film sensitivity detecting means and is represented by SV, an object distance of an object to be photographed is derived from range finding means and is represented by DV, an opening time information for operation of the shutter is represented by TVo stored in a memory means and an opening diaphragm value for the shutter is represented by AVo stored in a memory means, and the flash timing TVf is determined by the flash timing operating means which includes means for determining TVf from:

$$TVf = GVm + SV - DV + TVo - AVo.$$

3. A strobo controlling apparatus according to claim 1 wherein, for determining the flash time by said flash time operating means, the film sensitivity is derived from a film sensitivity detecting means and is represented by SV, an object distance of an object to be photographed is derived from the range finding means and is represented by DV, a flash timing information determined by said flash timing operating means is represented by TVp, an opening time information for operating the shutter is represented by TVo stored in a memory means and an opening diaphragm value for the shutter is represented by AVo stored in a memory means, the flash amount GVf of the strobo apparatus is determined by the flash time operating means which includes means for determining GVf from:

$$GVf = DV - SV + TVp - TVo + AVo.$$

4. A strobo controlling apparatus according to claim 1 wherein, for determining the judged diaphragm value by said judged value operating means, the guide number at the time of a maximum flash of the strobo apparatus is represented by GVm stored in said memorizing means, a film sensitivity is represented by SV derived from a film sensitivity detecting means and an object distance is represented by DV derived from range finding means, and the judged diaphragm value AVx is determined by the judged value operating means which includes means for determining AVx from:

$$AVx = GVm + SV - DV.$$

5. A strobo controlling apparatus according to claim 4 wherein said strobo apparatus includes a main condenser and means for determining a charged voltage correcting value Ca1 responsive to the charged voltage of said main condenser; and
said judged value operating means including means for determining the judged diaphragm value AVx from:

$$AVx = GVBm + SV - DV - Ca1.$$

6. A strobo controlling apparatus according to claim 4 further comprising pre-flash means operating the strobo apparatus for reducing red eye phenomenon and means responsive to operation of said pre-flash means for providing a correcting value Ca2 wherein said judged value operating means includes means for determining the judged diaphragm value AVx from:

$$AVx = GVm + SV - DV - Ca2.$$

7. A strobo controlling apparatus according to claim 5 wherein said strobo apparatus includes means for storing a voltage for operating said strobo apparatus and means responsive to the voltage stored in said storing means for adjusting a diaphragm value responsive to a value of said stored voltage.

8. A camera system comprising:
a strobo flashing apparatus for radiating a strobo light to an object to be photographed;
a flash amount controlling means for controlling a flash amount of said strobo flashing apparatus;
a guide number information outputting means for outputting guide number information of said strobo flashing apparatus;
a diaphragm means having an adjustable aperture being provided within a photographing light path;
a diaphragm controlling means for controlling an aperture size of said diaphragm means;
a range finding means for measuring the distance of an object to be photographed and outputting a distance information;
a film sensitivity information outputting means for outputting a sensitivity value responsive to a film loaded into said camera system;
an operating means for determining a judged diaphragm value from said guide number information, said distance information and said sensitivity value;
a comparing means for comparing the judged diaphragm value with a predetermined value; and
a switching means whereby, in response to a compared result of said comparing means, when said judged value is smaller than the predetermined value, a flash amount by said flash amount controlling means will made constant and the diaphragm means will be controlled by said diaphragm controlling means and, when said judged value is larger than the predetermined value, a diaphragm value by said diaphragm controlling means will be fixed and a flash amount will be controlled by said flash amount controlling means.

9. A strobo controlling apparatus for controlling a strobo apparatus during a photographing operation characterized by comprising:
an object distance information outputting means for outputting an object distance information between an object and said strobo apparatus;
a film sensitivity information outputting means for outputting information representing a film sensitivity of a film to be used during a photographing operation;
an outputting means for outputting a guide number information of the strobo apparatus forming part of the strobo controlling apparatus;
an operating means for determining a diaphragm value from a formula $GV + SV - DV$ wherein said guide number information is GV and is stored in a memory means, said film sensitivity information is SV and is derived from film sensitivity detecting means and said object distance information is DV and is derived from range finding means;
a comparing means for comparing said diaphragm value with a predetermined value; and
a flash time controlling means responsive to said comparing means whereby, in a case where said diaphragm value is smaller than the predetermined value, a value representing a substantially full flash of the strobo apparatus will be provided and, in a case where the diaphragm value is larger than the predetermined value, a fixed diaphragm value will be provided and said strobo guide number information will be selected responsive to said film sensitivity information and said object distance information to control the flash time of said strobo apparatus.

10. A strobo apparatus and a strobo controlling apparatus therefor whereby, in a performance of a photographing operation, a flash amount can be controlled by controlling a flash time, which is a length of time a flash developed by the strobo apparatus is maintained, comprising:
a gradually opening diaphragm combined sector shutter;

a memorizing means for memorizing information representing a guide number at a time of a maximum flash of said strobo apparatus;

a judged value operating means for determining a judged diaphragm value responsive to information representing a film sensitivity, and information representing a distance of an object to be photographed and said guide number;

first operating means for generating a value representing a first flash time which is a maximum flash time and a value representing a first flash timing relative to a time of opening of said sector shutter wherein said flash timing is determined responsive to selected ones of the information employed by said judged value operating means to determine a judged diaphragm value when said judged diaphragm value is smaller than a predetermined value;

second operating means for generating a value representing a predetermined second flash timing and a second flash time which is determined responsive to selected ones of the information employed by said judged diaphragm value operating means to determine a judged diaphragm value when said judged diaphragm value is larger than said predetermined value; and flash controlling means for controlling the flash of said strobo apparatus responsive to one of said first operating means and said second operating means.

11. A strobo controlling apparatus according to claim 10 wherein, for determining said judged diaphragm value by said judged value operating means, the predetermined value, represented by Nx, to be compared with the judged diaphragm value is determined by means for determining Nx according to the following formula: $Nx = TVp - TVo + AVo$, where TVp represents flash timing information and which is stored in a memory means, TVo representing opening time information of the shutter and which is stored in a memory means, and AVo represents opening diaphragm value information of the shutter and which is stored in a memory means.

12. A strobo controlling apparatus for a strobo apparatus whereby, in a performance of a photographing operating, an amount of flash developed by the strobo apparatus can be varied with a flash time, which represents a time interval during which a flash condition of the strobo apparatus is maintained, comprising:

a shutter means;

means for flashing said strobo apparatus causing strobo light to be directed toward an object to be photographed;

guide number information outputting means for outputting guide number information for said strobo apparatus;

operating means for determining a diaphragm value representing a proper exposure, said diaphragm value being determined responsive to information representing an object distance derived from range finding means, a film sensitivity derived from film sensitivity detecting means and a guide number stored in a memory means;

means for comparing the diaphragm value determined by said operating means with a predetermined value; and controlling means responsive to said comparing means for controlling a flash time of said strobo apparatus when a strobo light becomes said guide number when said diaphragm value is smaller than said predetermined value and for operating the shutter means at a diaphragm value which is fixed at said predetermined value and a strobo flashing time for operating the strobo apparatus is selected to provide a proper exposure when said diaphragm value is larger than said predetermined value.

13. A strobo controlling apparatus according to claim 12 further comprising varying means for varying said predetermined value in response to a focal distance information of a taking lens cooperating with said shutter means.

14. A camera having a built-in strobo controlling apparatus, comprising:

a diaphragm combined program shutter;

a strobo flashing apparatus for radiating a strobo light to an object to be photographed;

a guide number information outputting means for outputting guide number information of the strobo flashing apparatus;

a range finding means for measuring a distance of said object and outputting a distance value;

a sensitivity information outputting means for outputting a sensitivity value responsive to a film loaded into the camera;

an operating means for determining a flash timing of said strobo flashing apparatus from said guide number information, said distance information and said sensitivity information; said flash timing being a time of initiation of operating of said strobo apparatus;

a comparing means for comparing a flash timing determined by said operating means with a predetermined value; and a strobo flash controlling means whereby, in response to a compared result of said comparing means, when said flash timing is later than the predetermined value, said strobo flashing apparatus will fully flash at a predetermined timing and, when said flash timing is earlier than the predetermined value, said strobo flashing apparatus will flash at a predetermined timing and will be controlled with a flash amount responsive to said distance value and said film sensitivity value.

15. A camera according to claim 14 further comprising a varying means for varying said predetermined value in response to a focal distance information of a taking lens provided in said camera.

16. A camera according to claim 14 wherein said strobo apparatus includes charged voltage storing means and means for correcting a flash timing value responsive to the stored charge voltage of said charged voltage storing means.

17. Apparatus for controlling the amount of a flash generated by a flash apparatus by controlling a flash time, which is a length of time of a flash generated by said flash apparatus comprising:

shutter means operating from a closed to an open position in a gradual manner;

means for determining a distance between an object being photographed and said apparatus to provide distance information;

means for obtaining guide number information representing a maximum flash and means for providing film sensitivity information;

means for determining a first flash control data relative to an opening of said shutter means based upon said guide number and said film sensitivity and said distance information;

means for determining a second flash control data based upon said film sensitivity and said object information;

means for determining a diaphragm value based upon said film sensitivity, said object distance and said guide number information;

selecting means for selecting said first flash control data when an output of said determined diaphragm value is smaller than a predetermined threshold value and for selecting the second flash control data when said determined diaphragm value is greater than said predetermined threshold value; and flash controlling means for developing a control signal responsive to said selecting means.

18. An apparatus according to claim 17 wherein said first and second flash control data are stored in memory means responsive to their generation and preparatory to selection by said selection means.

19. An apparatus according to claim 17 wherein said first flash control data comprises data representing a timing of said flash relative to an opening of the shutter means.

20. An apparatus according to claim 19 wherein said first flash control data further comprises data representing a full flash time interval.

21. An apparatus according to claim 17 wherein said second flash control data comprises data representing the timing of an operation of said flash relative to an opening of the shutter means.

22. An apparatus according to claim 21 wherein said second flash control data further comprises data representing a flash time interval less than a full flash time interval.

23. An apparatus according to claim 22 wherein said flash time interval is a function of said film sensitivity and distance information.

24. A strobo controlling apparatus for controlling a strobo apparatus, comprising:

memorizing means for memorizing information representing a guide number GVm of the strobo apparatus at a substantially full flash;

judged value operating means for determining a judged diaphragm value AVx responsive to information representing a film sensitivity SV derived from film sensitivity detecting means, information representing a distance DV of an object to be irradiated by the strobo apparatus derived from range finding means and information representing the guide number GVm at said full flash and stored in said memorizing means;

first operating means for determining a value relating to a diaphragm value to provide a proper exposure when the strobo apparatus is operated at full flash when the judged diaphragm value is smaller than a predetermined value;

second operating means for generating a value representing a proper flash amount for controlling the strobo apparatus when a shutter is operated by a predetermined diaphragm value when said judged diaphragm value is larger than said predetermined value; and flash controlling means for controlling a flash of the strobo apparatus responsive to one of said first operating means and second operating means.

25. A strobo controlling apparatus according to claim 24 characterized in that a camera controlled by said strobo controlling apparatus has a gradually opening sector shutter and said first operating means determines a flash timing of said strobo apparatus for controlling said shutter.

26. A strobo controlling apparatus according to claim 24 wherein said judged value operating means determined the predetermined value N to be compared with the judged diaphragm value, the value N being determined by means for determining N according to the following formula:

$$N = TVp - TVo + AVo,$$

where TVp represents flash timing information stored in a memory means, TVo represents opening time information of a shutter derived from means responsive to a setting of a taking lens, and AVo represents opening diaphragm value information of the shutter derived from means responsive to a setting of a taking lens.

27. The strobo controlling apparatus of claim 26 wherein the taking lens is a zoom lens and the setting is a zoom setting.

28. A strobo controlling apparatus comprising:

a strobo apparatus;

memorizing means for memorizing information representing a guide number GVm of the strobo apparatus at a maximum flash;

a judged value operating means for determining a judged diaphragm value responsive to at least information representing a distance DV of an object from said apparatus;

first operating means for determining a value relating to a diaphragm value for a shutter for providing a proper exposure when the strobo apparatus is operated to provide a full flash, when said judged diaphragm value is larger than a predetermined value;

second operating means for determining a proper flash amount for the strobo apparatus for a given predetermined diaphragm value when said judged diaphragm is smaller than said predetermined value; and flash controlling means for controlling a flash of the strobo apparatus responsive to one of said first operating means and said second operating means.

29. A strobo controlling method for a strobo apparatus comprising the steps of:

(a) reading information representing a guide number GVm out of a memorizing means for storing information representing the guide number GVm at a substantially full flash;

(b) determining a distance of an object from said strobo apparatus;

(c) determining a judged value responsive to information representing said distance of an object from said strobo apparatus;

(d) comparing said judged value with a predetermined value;

(e) determining a value relating to a diaphragm value for providing a proper exposure for a shutter when the strobo apparatus is operated at maximum flash, when said judged value is larger than said predetermined value;

(f) determining a flash amount for a proper exposure at a predetermined diaphragm value when the judged value is smaller than said predetermined value; and (g) controlling the flash of the strobo apparatus responsive to the values determined in one of step (e) and step (f).

30. A method for operating a camera having taking lens and an adjustable diaphragm shutter and a strobo apparatus having a guide number associated therewith which represents a guide number of the strobo apparatus at full flash, said method comprising the steps of:

(a) measuring a distance of an object to be irradiated by the strobo apparatus;

(b) determining a film sensitivity of a film to be employed in photographing said object;

(c) providing a guide number for the strobo apparatus;

(d) determining a diaphragm value from said guide number, said film sensitivity and said distance;

(e) comparing the diaphragm value with a predetermined value;

(f) operating the strobo apparatus at full flash and determining the diaphragm value for controlling said adjustable diaphragm shutter when the determined diaphragm value is smaller than said predetermined value;

(g) providing a fixed diaphragm value and providing a flash time value for proper exposure when a diaphragm value determined by step (d) is larger than said predetermined value; and (h) operating the adjustable diaphragm shutter and strobo apparatus in accordance with the values determined during one of step (f) and step (g).

* * * * *

UNITED STATES PATENT AND TRADEMARK OFFICE
CERTIFICATE OF CORRECTION

PATENT NO. : 5,255,047  
DATED : October 19, 1993  
INVENTOR(S) : Toshiaki Ishimaru, Minoru Hara, Atsushi Maruyama and Keiichi Tsuchida Page 1 of 6

It is certified that error appears in the above-indentified patent and that said Letters Patent is hereby corrected as shown below:

On title page, item [57] -

In the Abstract:

Line 1, change "strobe" to "strobo".
Line 12, change "strobe" to "strobo".

Column 1, line 9 change "strobe" to "strobo".
Column 1, line 10 change "strobe" to "strobo".
Column 1, line 12 change "strobe" to "strobo".
Column 1, line 17 change "strobe" to "strobo".
Column 1, line 29 change "strobe" to "strobo".
Column 1, line 49 change "strobe" to "strobo".
Column 1, line 52 change "EV=AB" to "EV=AV".
Column 3, line 30 change "strobe" to "strobo".
Column 3, line 44 change "ensuring" to "measuring".
Column 3, line 44 change "strobe" to "strobo".
Column 3, line 50 change "strobe" to "strobo".
Column 3, line 52 change "strobe" to "strobo".
Column 3, line 53 change "in" to "is".

UNITED STATES PATENT AND TRADEMARK OFFICE
CERTIFICATE OF CORRECTION

PATENT NO. : 5,255,047
DATED : October 19, 1993
INVENTOR(S) : Toshiaki Ishimaru, Minoru Hara, Atsushi Maruyama and Keiichi Tsuchida It is certified that error appears in the above-indentified patent and that said Letters Patent is hereby corrected as shown below:

Column 3, line 56 change "strobe" to "strobo".
Column 3, line 57 change "strobe" to "strobo".
Column 4, line 15 change "strobe" to "strobo".
Column 4, line 19 change "strobe" to "strobo".
Column 4, line 31 change "strobe" to "strobo".
Column 4, line 52 change "strobe" to "strobo".
Column 5, line 14 change "RgS" to "Rg5".
Column 5, line 45 change "strobe" to "strobo".
Column 5, line 58 change "strobe" to "strobo".

Column 5, line 62 change "strobe" to "strobo".
Column 5, line 65 change "strobe" to "strobo".
Column 5, line 66 change "strobe" to "strobo".
Column 6, line 2 change "means (see Fig. 5)" to "means 5 (see Fig. 1)"
Column 6, line 20 change "strobe" to "strobo".
Column 6, line 38 change "strobe" to "strobo".
Column 6, line 39 change "strobe" to "strobo".
Column 6, line 46 after the word "flow" delete the word "a".

UNITED STATES PATENT AND TRADEMARK OFFICE
CERTIFICATE OF CORRECTION

PATENT NO. : 5,255,047
DATED : October 19, 1993
INVENTOR(S) : Toshiaki Ishimaru, Minoru Hara, Atsushi Maruyama, and Keiichi Tsuchida It is certified that error appears in the above-indentified patent and that said Letters Patent is hereby corrected as shown below:

Column 6, line 49 change "(step S1))" to "(step S1)".
Column 7, line 1 change "strobe" (first occurrence) to "strobo".
Column 7, line 1 change "strobe" (second occurrence) to "strobo".
Column 7, line 3 change "strobe" to "strobo".
Column 7, line 6 change "preflash" (first occurrence) to "pre-flash".
Column 7, line 6 change "preflash" (second occurrence) to "pre-flash".
Column 7, line 7 change "preflash" to "pre-flash".
Column 7, line 46 change "recir" to "rear".
Column 7, line 48 change "preflash" to "pre-flash".
Column 7, line 53 change "preflash" to "pre-flash".
Column 7, line 65 change "preflash" to "pre-flash".
Column 8, line 26 change "preflash" to "pre-flash".
Column 8, line 28 change "preflash" to "pre-flash".
Column 8, line 29 change "preflash" to "pre-flash".
Column 8, line 30 change "preflash" to "pre-flash".
Column 8, line 32 change "preflash" to "pre-flash".

UNITED STATES PATENT AND TRADEMARK OFFICE
CERTIFICATE OF CORRECTION

PATENT NO. : 5,255,047
DATED : October 19, 1993
INVENTOR(S) : Toshiaki Ishimaru, Minoru Hara, Atsushi Maruyama, and Keiichi Tsuchida It is certified that error appears in the above-indentified patent and that said Letters Patent is hereby corrected as shown below:

Column 8, line 35 change "preflash" to "pre-flash".

Column 9, line 41 change "PREFLASH" TO "PRE-FLASH".
Column 9, line 43 change "preflash" to "pre-flash".

Column 11, line 8 after the word "as" insert "follows:".
Column 12, line 5 change "strobe" to "strobo".
Column 12, line 6 change "strobe" to "strobo".
Column 12, line 16 change "strobe" to "strobo".
Column 12, line 44 change "strobe" to "strobo".
Column 12, line 58 change "strobe" to "strobo".
Column 12, line 64 change "strobe" to "strobo".
Column 12, line 64 change "preflash" to "pre-flash".
Column 12, line 66 change "preflash" to "pre-flash".
Column 13, line 1 change "preflash" to "pre-flash".
Column 13, line 2 change "preflash" to "pre-flash".
Column 13, line 6 change "preflash" to "pre-flash".
Column 14, line 20 after "DV" move "= TVf - TVo + AVo + 5" to the next line.
Column 14, line 41 change "preflash" to "pre-flash".

UNITED STATES PATENT AND TRADEMARK OFFICE
CERTIFICATE OF CORRECTION

PATENT NO. : 5,255,047
DATED : October 19, 1993
INVENTOR(S) : Toshiaki Ishimaru, Minoru Hara, Atsushi Maruyama, and Keiichi Tsuchida It is certified that error appears in the above-indentified patent and that said Letters Patent is hereby corrected as shown below:

Column 14, line 43 change "preflash" to "pre-flash".
Column 14, line 45 change "preflash" to "pre-flash".
Column 14, line 53 change "preflash" (first occurrence) to "pre-flash".
Column 14, line 53 change "preflash" (second occurrance) to "pre-flash".
Column 14, line 54 change "preflash" to "pre-flash".
Column 14, line 55 after the word "the" insert "value".
Column 14, line 58 change "GVf" to "GVf'".
Column 14, line 58 change "Ca1 + Ca2" to "Cb1 + Cb2".
Column 15, line 6 change "GVf" to "GVf'".
Column 15, line 13 change "strobe" to "strobo".
Column 15, line 16 change "preflash" to "pre-flash".
Column 15, line 50 change "GVf" to "GVf'".
Column 15, line 59 change "strobe" to "strobo".

<u>In the Claims:</u>

Claim 1, column 16, line 39 change "mans" to "means".
Claim 3, column 17, line 7 delete the word "the".

UNITED STATES PATENT AND TRADEMARK OFFICE
CERTIFICATE OF CORRECTION

PATENT NO. : 5,255,047
DATED : October 19, 1993
INVENTOR(S) : Toshiaki Ishimaru, Minoru Hara, Atsushi Maruyama, and Keiichi Tsuchida It is certified that error appears in the above-indentified patent and that said Letters Patent is hereby corrected as shown below:

```
Claim 8, column 18, line 20 after the word "will" insert "be".
Claim 11, column 19, line 38 change "representing" to "represents".
Claim 12, column 19, line 45 change "operating" to "operation".
Claim 14, column 20, line 31 change "operating" to "operation".
Claim 16, column 20, line 53 change "charge" to "charged".
Claim 24, column 21, line 62 change "by" to "at".
Claim 26, column 22, line 9 change "mined" to "mines".
Claim 28, column 22, line 42 after the word diaphragm" insert the word "value".
Claim 29, column 22, line 53 change "a" to "the".
Claim 29, column 22, line 56 change "said" to "a".
```

Signed and Sealed this

Eighteenth Day of October, 1994

Attest:

BRUCE LEHMAN

Attesting Officer     Commissioner of Patents and Trademarks

UNITED STATES PATENT AND TRADEMARK OFFICE
CERTIFICATE OF CORRECTION

PATENT NO. : 5,255,047
DATED : October 19, 1993
INVENTOR(S) : Toshiaki Ishimaru, et al It is certified that error appears in the above-indentified patent and that said Letters Patent is hereby corrected as shown below:

Column 5, line 59, change "above mentioned" to --above-mentioned--.
Column 9, line 40, delete "of" (first occurrence).
Column 10, line 5, change "mula" to --mulae--.

Signed and Sealed this

Twenty-ninth Day of November, 1994

Attest:

BRUCE LEHMAN

Attesting Officer     Commissioner of Patents and Trademarks

UNITED STATES PATENT AND TRADEMARK OFFICE
CERTIFICATE OF CORRECTION

PATENT NO. : 5,255,047
DATED : October 19, 1993
INVENTOR(S) : Toshiaki Ishimaru, Minoru Hara, Atsushi Maruyama and Keiichi Tsuchida It is certified that error appears in the above-indentified patent and that said Letters Patent is hereby corrected as shown below:

Column 9, line 39, delete "of" (first occurrence)

Signed and Sealed this

Twenty-fourth Day of January, 1995

Attest:

BRUCE LEHMAN

Attesting Officer

Commissioner of Patents and Trademarks